US008194250B2

(12) United States Patent
Morgan

(10) Patent No.: US 8,194,250 B2
(45) Date of Patent: Jun. 5, 2012

(54) WIDEBAND RF DETECTION

(75) Inventor: Dennis R. Morgan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 1041 days.

(21) Appl. No.: 12/155,184

(22) Filed: May 30, 2008

(65) Prior Publication Data

US 2012/0112949 A1 May 10, 2012

(51) Int. Cl.
*G01N 21/55* (2006.01)
(52) U.S. Cl. .......................... 356/445; 342/191; 378/57
(58) Field of Classification Search .......... 356/602–608, 356/3.01–3.09; 342/22, 25 R–25 F, 176, 342/179, 181, 191; 250/559.22, 559.23; 378/57

See application file for complete search history.

(56) References Cited

U.S. PATENT DOCUMENTS

| 2,350,820 | A | * | 6/1944 | Rettinger | ...................... | 356/3.06 |
| 5,592,170 | A | | 1/1997 | Price et al. | | |
| 5,910,973 | A | * | 6/1999 | Grodzins | .......................... | 378/57 |
| 6,130,641 | A | * | 10/2000 | Kraeutner et al. | .............. | 342/22 |
| 6,150,972 | A | | 11/2000 | Bickel et al. | | |
| 6,370,222 | B1 | * | 4/2002 | Cornick, Jr. | ..................... | 378/57 |
| 6,553,094 | B1 | * | 4/2003 | Bernardi et al. | ................. | 378/57 |

FOREIGN PATENT DOCUMENTS

EP 0031 443 7/1981

OTHER PUBLICATIONS

International Search Report and written Opinion dated Aug. 17, 2009 for counterpart European Application.

Article: Aryafar F et al: "Through wall imaging at microwave frequencies using space time focusing" Antennas and Propagation Society Symposium 2004, IEEE Monterey, CA, Jun. 20, 2004.
Article: Constantinous CC et al. "On the Modeling of Reflected Energy From Building Faces in Microcellular Mobile Radio Planning Tools" IEEE Transactions on Antennas and Propagation, IEEE Service Center, Piscataway, NJ, Aug. 1, 2005.
Article: Jennifer I Halman et al: "SAR Processing of Ground-Penetrating Radar Data for Buried UXO Detection: Results from a Surface-Based System" IEEE Transactions on Antennas and Propagation, IEEE Service Center, Piscataway, NJ Jul. 1, 1998.
Article: Antonello G et al: "A ground-based interferometer for the safety monitoring of landslides and structural deformations" IGARSS 2003, IEEE 2003 International Geoscience and Remote Sensing Symposium Proceedings, Toulouse, France and New York, NY—Jul. 2003.
Article: Yugan Ma et al: "UWB Reference-Free Self-Positioning with Electrical Scanning Directional Antenna" Ultra-Wideband, 2007. ICUWB 2007. IEEE International Conference on, IEEE, PI. Sep. 1, 2007.
Article: Axelsson S R J: :SAR/MTI Radar Mapping from Ships and Ground Based Vehicles IGARSS 2002, IEEE 2002 International Geoscience and Remote Sensing Symposium, Toronto, Sweden and New York, NY Jun. 2002.
Article: Antonelli G et al: "Ground-based SAR interferometry for monitoring mass movements" Landslides: Journal of the International Consortium on Landslides, Springer, Berlin, DE, Jan. 1, 2004.

\* cited by examiner

*Primary Examiner* — Kara E Geisel
(74) *Attorney, Agent, or Firm* — Harness, Dickey & Pierce

(57) ABSTRACT

The present invention relates to a method of wideband RF detection. The method may include transmitting a signal from a plurality of transmit positions along a drive path. Reflections of the transmitted signal are received at a plurality of receive positions along the drive path. A signature is formed based on arrival angles of the reflections at each of the receive positions. The signature includes the arrival angles of the reflections at each of the receive positions with respect to a distance along the drive path of a corresponding transmit position and a corresponding receive position of each of the reflections.

15 Claims, 15 Drawing Sheets
(7 of 15 Drawing Sheet(s) Filed in Color)

*FIG. 3A*
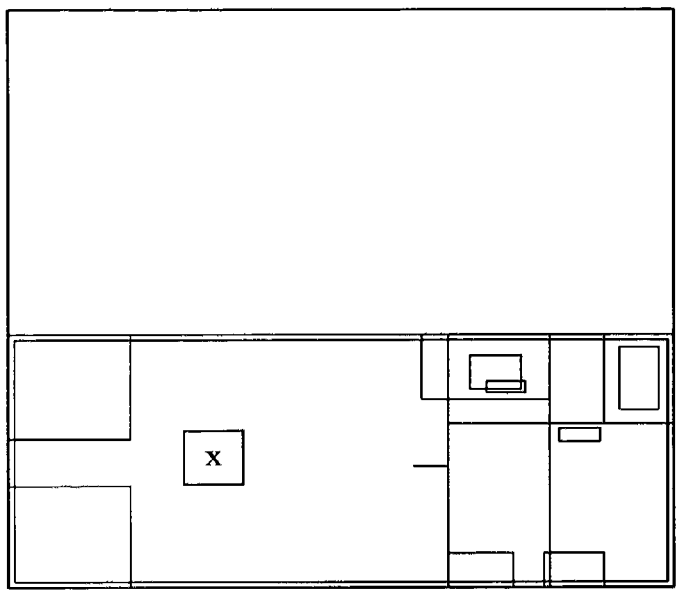
*FIG. 3B*
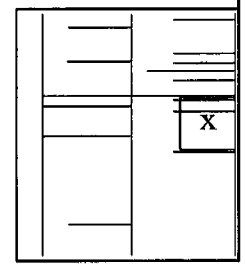
*FIG. 3C*
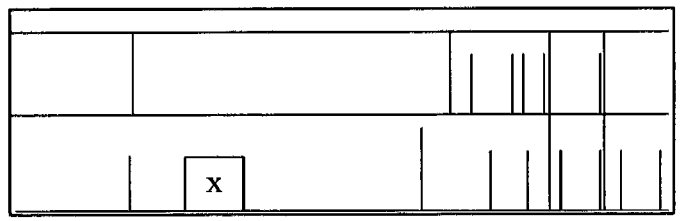
*FIG. 3*

WIDEBAND RF DETECTION

GOVERNMENT CONTRACT

This invention was made with Government support under Contract HR0011-06-C-0110, subcontract 061033, awarded by the Defense Advanced Research Projects Agency (DARPA). The Government has certain rights in this invention.

BACKGROUND

Through-wall radar sensing has been considered for imaging objects over a relatively small area within a building from a single aspect. However, conventional through-wall sensing lacks the ability for a meaningful building-wide characterization.

Synthetic aperture radar (SAR) techniques have been used to reconstruct the exterior of buildings from multiple aspects. However, conventional SAR techniques also lack the ability for a meaningful-building wide characterization.

SUMMARY

The present invention relates to a method of wideband RF detection.

In one embodiment, the method includes transmitting a signal from a plurality of transmit positions along a drive path. Reflections of the transmitted signal are received at a plurality of receive positions along the drive path. A signature is formed based on arrival angles of the reflections at each of the receive positions.

The signature includes the arrival angles of the reflections at each of the receive positions with respect to a distance along the drive path of a corresponding transmit position and a corresponding receive position of each of the reflections.

The signature includes a path delay of the received reflections at each of the receive positions along the drive path with respect to transmit times of corresponding transmit signals.

The signature is represented as a gram plot of the arrival angles of the reflection at each of the receive positions with respect to a distance along the drive path of a corresponding transmit position and a corresponding receive position of each of the reflections at each of the receive positions along the drive path. Coloring is used to indicate a path delay of the received reflections.

Beamforming is performed along the drive path to derive the received reflections for the signature. The arrival angles of the received reflections are distributed across a plurality of bins of a column of a matrix for each corresponding transmit/receive position par. The bins are filled with a complex path amplitude of the reflections, each column of the matrix corresponding to a single transmit/receive position pair.

An interior of a structure is inferred based on the signature by matching trajectories of the arrival angles of the reflections to identify corners within the structure.

BRIEF DESCRIPTION OF THE DRAWINGS

The patent or application file contains at least one drawing executed in color. Copies of this patent or patent application publication with color drawing will be provided by the Office upon request and payment of the necessary fee.

Example embodiments will become more fully understood from the detailed description given herein below and the accompanying drawings, wherein like elements are represented by like reference numerals, which are given by way of illustration only and thus are not limiting of the present invention, and wherein:

FIGS. 3A-3C illustrate a top, side, and front views of an example building, respectively;

DETAILED DESCRIPTION OF EXAMPLE EMBODIMENTS

Figure 1:
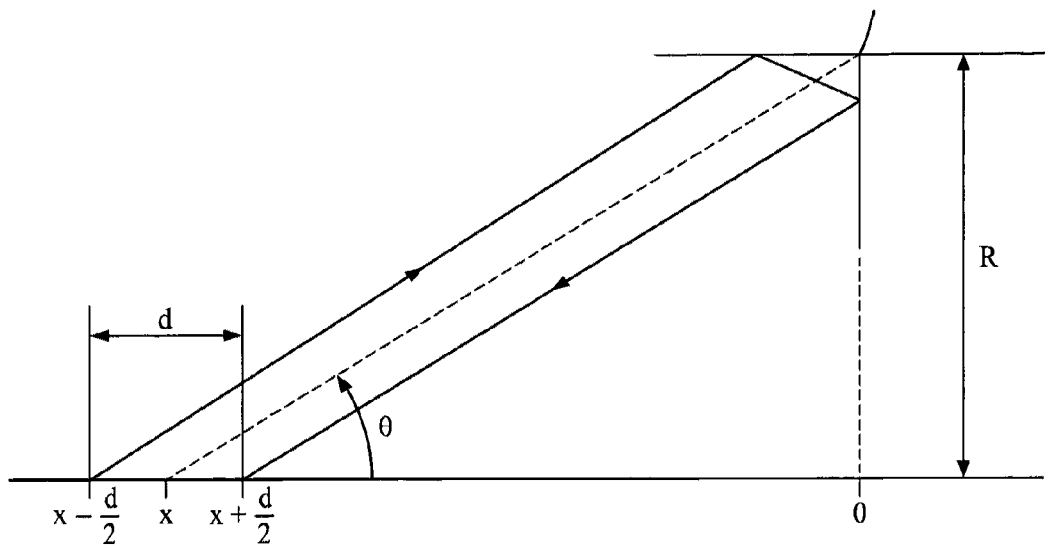
FIG. 1 illustrates an overall geometry of a reflection from a dihedral corner formed by the intersection of two walls.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments may sense changes within structures, e.g., building structures, using wideband RF probe signals with an array of sensors. Multiple beamformer snapshots may be taken, (e.g., in a "feature extraction" step of a pattern recognition problem), along a transmit/receive (Tx/Rx) drive path outside of a building to form a unique overall building signature.

Spectrograms, (e.g., spectrograms similar to those used to display analytical speech patterns, which consist of a two-dimensional plot that is shaded in intensity over time and frequency) may be used as a display for internal building structures. There are well-established digital signal processing techniques for analysis and recognition of spectrogram patterns, including dynamic time warping (DTW), hidden Markov models (HMM), and others. A "gram" type of display showing beamformer output amplitude as intensity over angle in one dimension and over distance along a drive path in the other dimension, with color added to represent path time delay, may be used. The gram type of display signature may be collected and kept on file for each building or structure of interest, and/or monitored at intervals to detect significant changes within the building or structure.

Example embodiments may employ a ray trace method to develop and simulate the gram display with physical measurements of an actual building to generate backscatter data over multiple moving Tx/Rx locations along a drive path. Data from the physical measurements may be processed, (e.g., using Matlab routines), to display dynamic plots of ray paths, path loss, simulated beamformer response, and/or a composite gram display. Simulations may be developed to determine the detectability of an article occlusion placed within the building, as well as established robustness to drive-path perturbations.

Specular reflections from corners formed by interior building walls form a unique, robust signature as the Tx/Rx location moves along a drive path. For example, the geometry of a two-dimensional specular reflection from a single corner is discussed below as an example of an expected response. The characteristic behavior of these specular reflections will be subsequently used to interpret the gram plot as will be discussed later.

FIG. 1 shows the overall geometry of a reflection from a dihedral corner formed by the intersection of two walls, as viewed from above. A ray is transmitted from x−d/2 on the x-axis towards the corner at (0,R) with a certain arrival angle θ such that the reflected ray arrives at a receiver located at x+d/2. For a given Tx/Rx x-axis separation d and y-axis range R, the arrival angle θ is uniquely determined from this geometry, as is illustrated in the below equations (1) and (2). The Tx/Rx x-axis separation d may be the distance on the x-axis between the transmission of the ray, as indicated by x−d/2, and the receiver located at x+d/2, with x being a midway point between the Tx and Rx rays. The range R may be the distance on the y-axis from the drive path to the parallel-facing building wall.

Assuming x≦−d/2, the reflection comes from the corner on the left side of the wall intersection. The dashed line in FIG. 1 from (x, 0) to (0, R) is midway between the Tx and Rx rays. We see that the tan θ is computed in accordance with the following equation:

$$\tan\theta = \frac{R}{|x|}, x \leq -\frac{d}{2} \qquad (1)$$

Rewriting equation (1) in terms of cos θ and noting the symmetry of FIG. 1, the angle cosine trajectory may be computed in accordance with the following equation:

$$\cos\theta = \frac{-\text{sgn}(x)}{\sqrt{1 + R^2/x^2}}, |x| \geq \frac{d}{2} \qquad (2)$$

Figure 2:
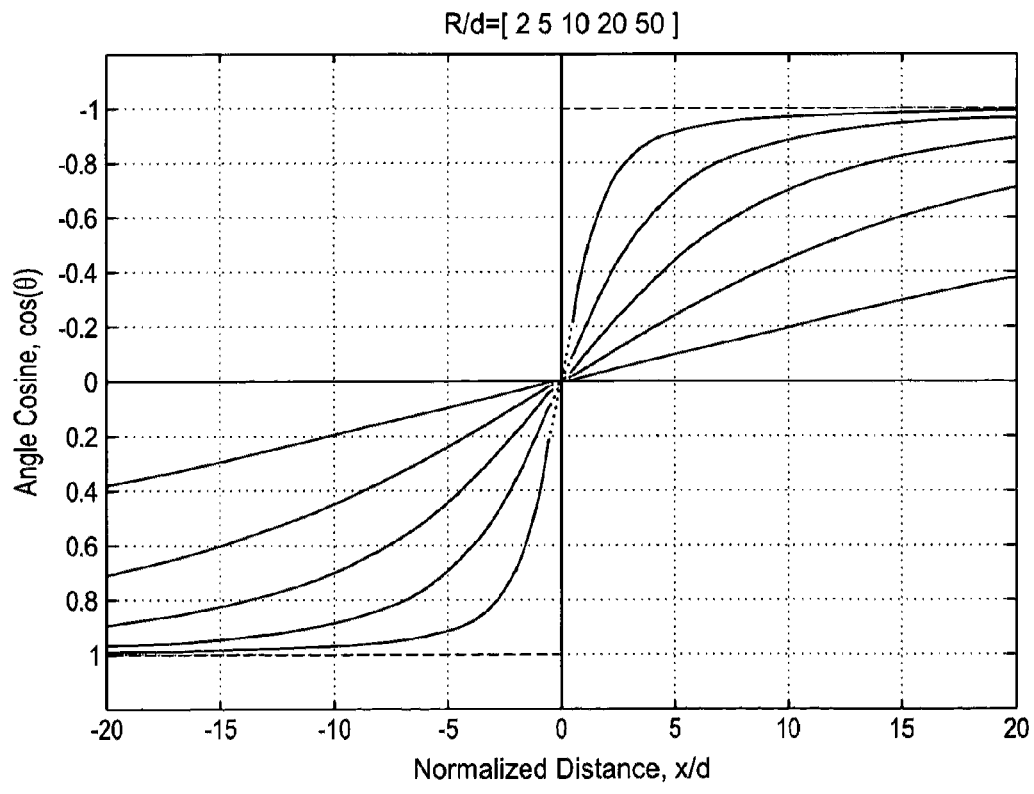
FIG. 2 illustrates a normalized plot of angel cosine trajectories whose curvature depends on the ratio R/d.

FIG. 2 is a normalized plot of equation (2), which illustrates characteristic trajectories whose curvature depends on the ratio R/d. In FIG. 2, the angle cosine from the dihedral corner reflection is shown as function of a normalized transverse distance, for R/d=2, 5, 10, 20, and 50. This characteristic behavior will be used in the next section to interpret the gram plots. Although example embodiments are described above as computing an arrival angle θ in a two dimensional coordinate system, example embodiments are not limited thereto, and the arrival angle θ may be computed in a three-dimensional coordinate system.

FIGS. 3A, 3B and 3C illustrate a top, side, and front views of an example building, respectively. The overall (x,y) dimensions of the foundation pad of the building are 22.86 m×21.64 m and the building proper in three dimensions (x,y,z) is 22.56 m×9.14 m×7.62 m.

Example embodiments are described below using wideband RF probe signals having an operating frequency of 2.4 GHz to form a building signature based on the geometry and specifications of the walls depicted in the example building illustrated in FIGS. 3A-3C. For example, the Wireless System Engineering (WiSE) ray-tracing model (e.g., a simulator) is used to obtain wideband impulse responses. An impulse response is the time response of a received signal to a transmitted wideband RF impulse.

In an example embodiment, a generic input file with variable-named Tx and Rx locations may be written to define nominal conditions and parameter values within the WiSE model. In this particular example embodiment, nbounce is set to 5, betamax is set to $1.0 \times 10^{-9}$, and the threshold value is set to 100. It is noted that other variations in the conditions and parameters for the WiSE model for obtaining wideband impulse responses may be within example embodiments. The Tx/Rx locations may be linearly varied along a drive path, obtaining a set of multiple impulse responses, e.g., WiSE impulse responses. However, example embodiments are not limited thereto, and the Tx/Rx locations may be varied in any direction(s) in a three-dimensional space. The process of varying the Tx/Rx locations may be automated using a Unix shell script that sequentially substitutes numerical values for the Tx/Rx variable names, runs the WiSE routine, (e.g., on a Sun Ultra workstation), and concatenates the output data into one file.

In an example embodiment, the x-axis Tx location may be varied in equal increments from an initial position to an end position with constant y and z positions, and/or the receive position Rx may track the transmit position Tx with a fixed x-axis separation. However, the drive path may be varied in any desired, or alternatively, predetermined direction. Each impulse response may contain a list of the computed ray paths, showing for each ray path the complex path amplitude, delay, and azimuth and elevation departure and arrival angles. The ray path may be the transmitted angles-of-departure and received angles of arrival. A multiple-run output file of responses generated in this "drive-by" scenario may be used in various dynamic display routines, as discussed below.

Example embodiments are described below for example transmitter positions (in meters) selected as $(x_T,y_T,z_T)=(-5:1:28,-7.5,2.5)$, where an origin transmitter position is the lower left front corner of the example building depicted in FIGS. 3A-3C, and the Rx in each instance is located at $(x_R, y_R, z_R)=(x_T+1,y_T,z_T)$, i.e., shifted 1 m to the right of the Tx. For example, the transmit positions Tx traverse a drive path 7.5 m away from the front edge of the example building and at a height of 2.5 m, starting 5 m from the left end and ending at 28−22.86=5.14 m from the right.

A progression of the ray paths as the Tx/Rx position progresses may be determined and/or displayed, for example, as a drive-by "movie," (e.g., using a Matlab program). The drive-by movie display may go from frame to frame, (e.g., as a return key is pressed), with the ability to print individual frames.

Figure 4A:
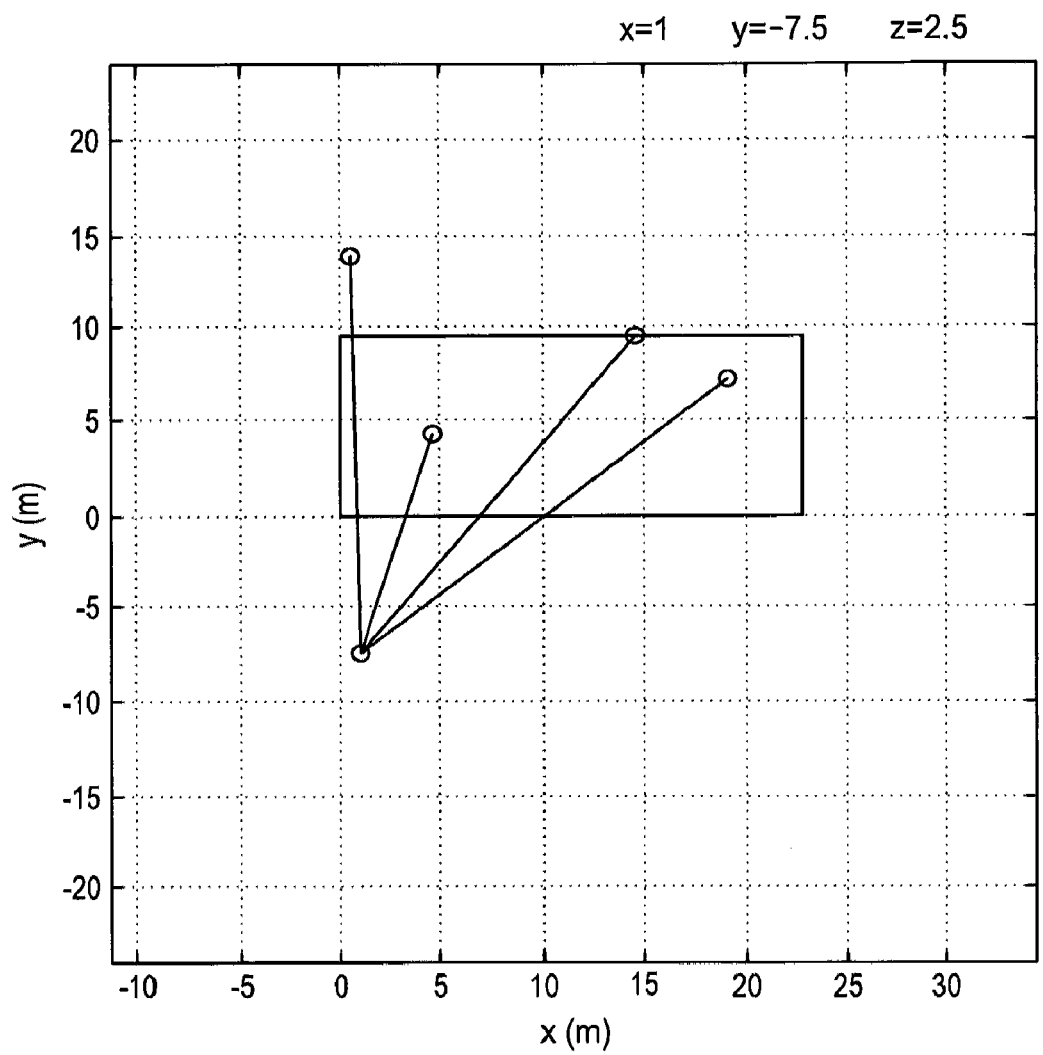
FIGS. 4A-4C illustrate three example ray frames for $x_R=1$, 10, 21, respectively.
Figure 4B:
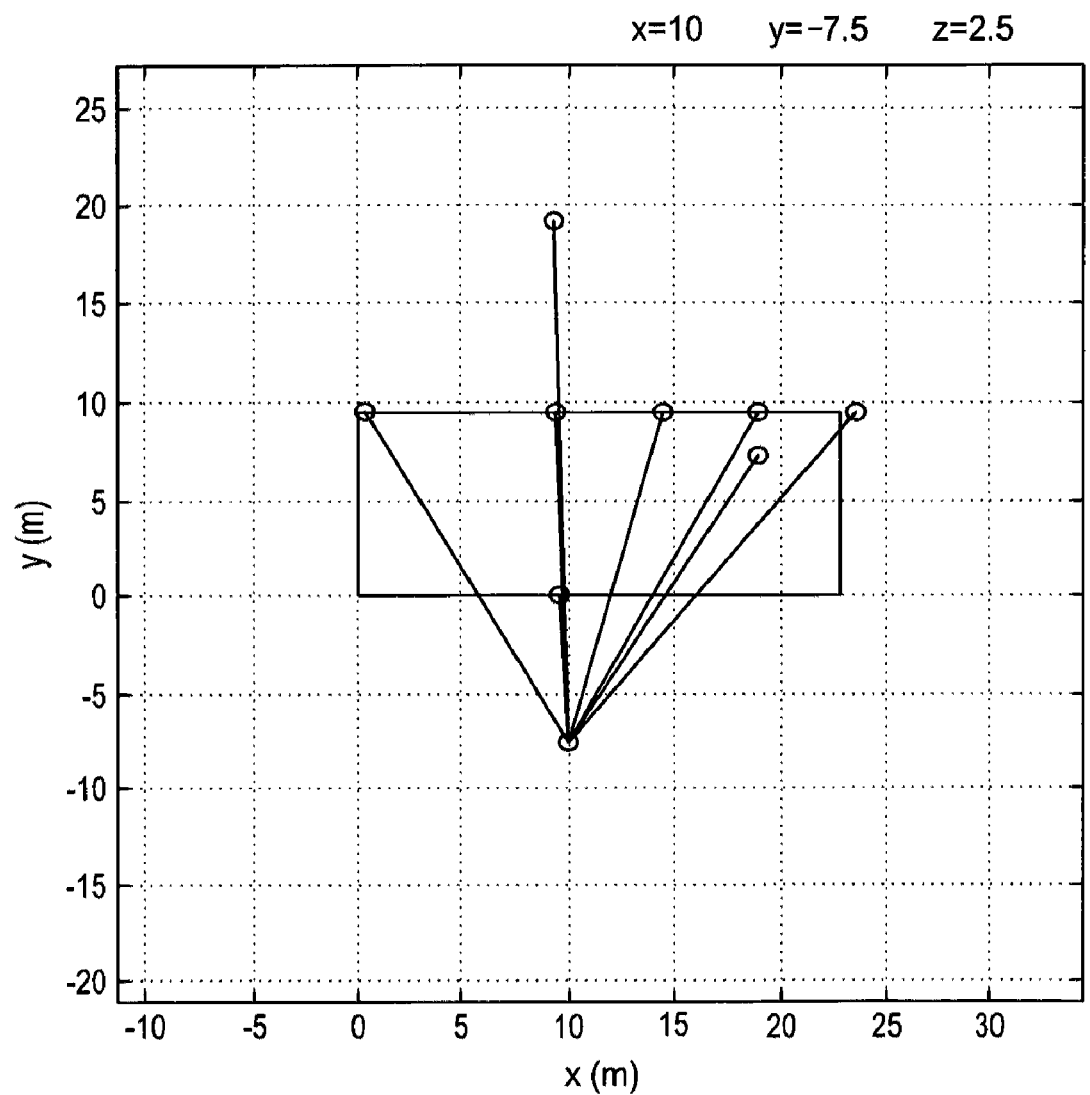
Figure 4C:
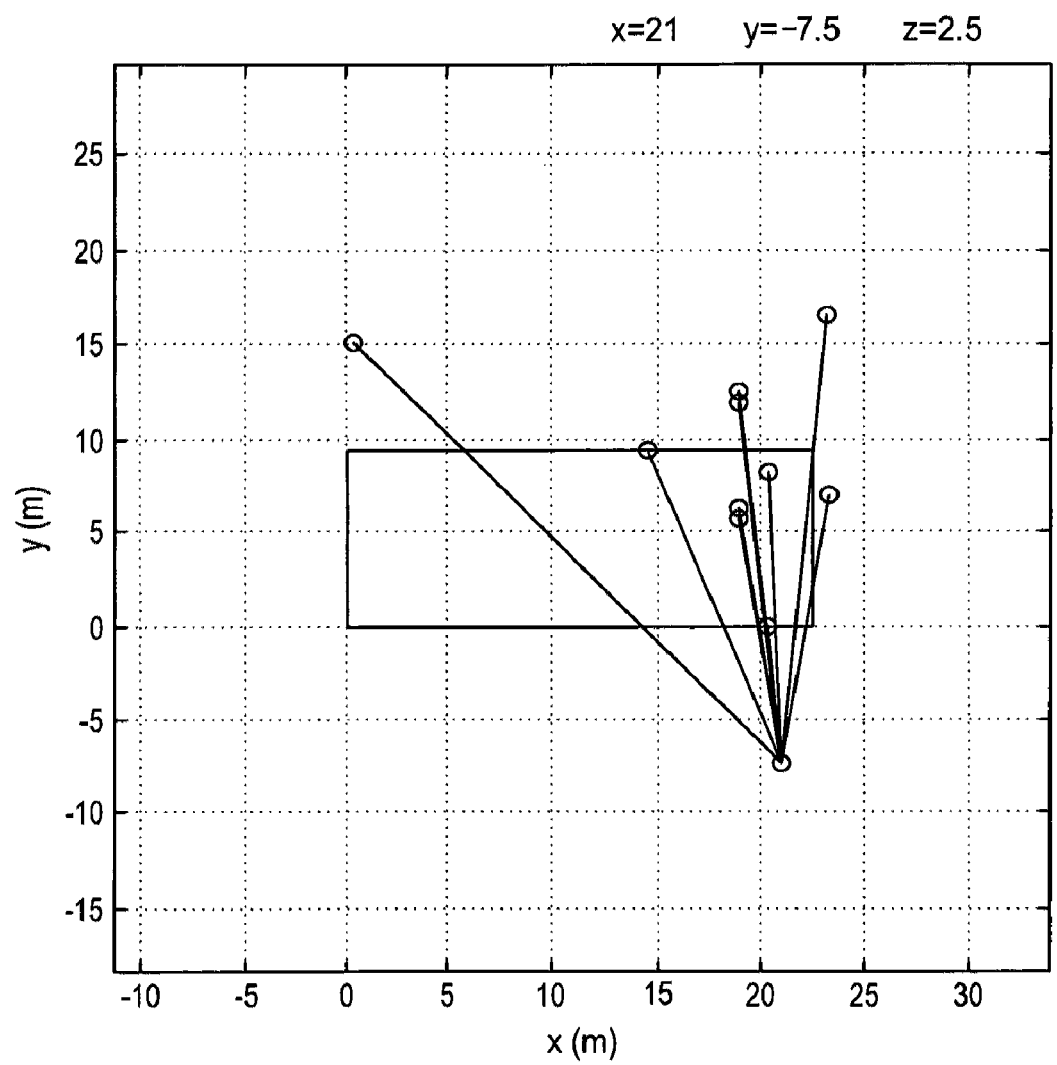

FIGS. 4A, 4B and 4C show three example ray frames for $x_R=1, 10, 21$, respectively. The rectangle in FIGS. 4A, 4B and 4C depicts a top view of the building proper illustrated in FIG. 3A, not including the foundation pad. As can be seen, there may generally be some returns from the front and rear wall nearer 90°, accompanied by corner reflections from internal walls, representing the salient feature of the probing, and thereby generating a unique signature for a particular building.

Similarly, the ray path loss as a function of the received azimuthal angle-of-arrival (AoA) may be determined and/or displayed, (e.g., using a Matlab program). The ray path loss may be the difference between the transmitted and received intensity of the ray path. For example, a beamforming process may be simulated, and the simulated responses may be plotted in terms of the angle cosine so that the responses are invariant with steering angles.

In an example embodiment, the AoA cosine may be quantized, (e.g., in 128 steps from 1 to −127/128 (0 to 172.83 degrees)). For each receive position $X_R$, a column vector, e.g., a 128×1 column vector, is generated. In other words, for each receive position $X_R$, the 128 bins (representing the quantized AoA cosine) is filled with their corresponding complex path amplitude of the individual rays.

Figure 5:
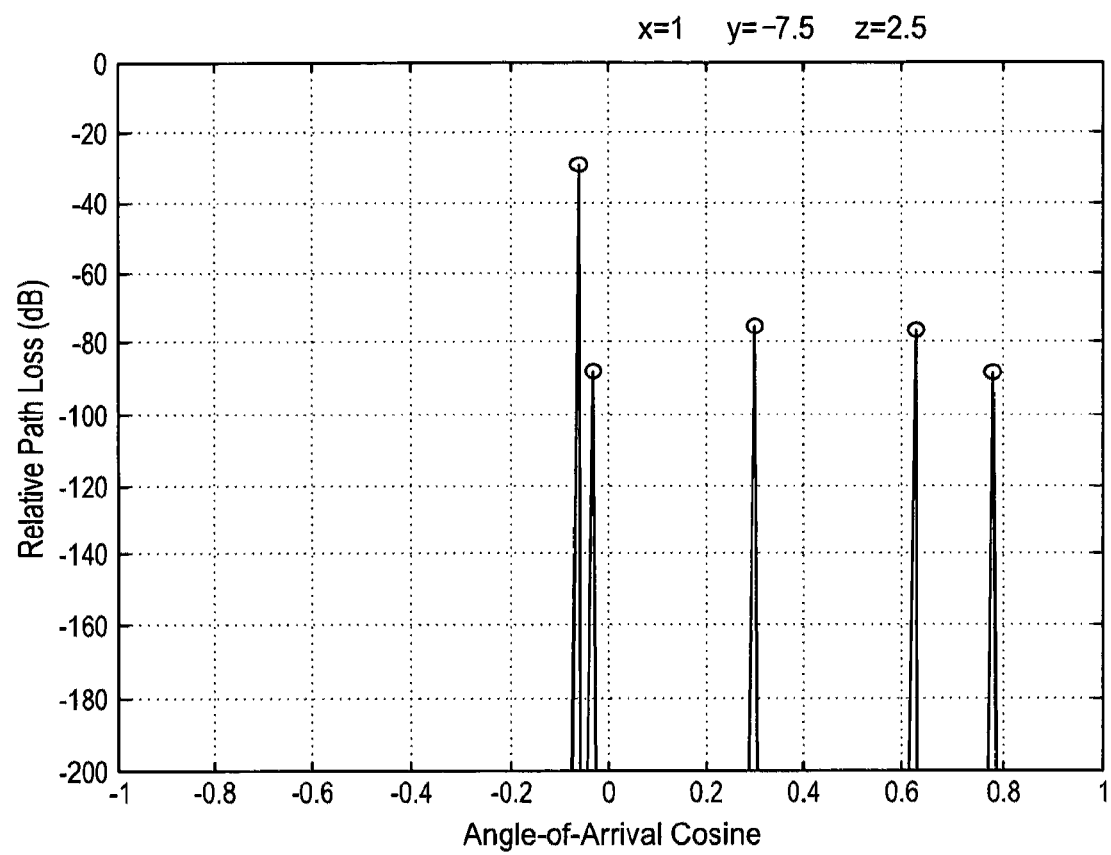
FIG. 5 illustrates path loss versus the quantized AoA cosine for the example contained in FIG. 4A.

FIG. 5 illustrates path loss versus the quantized AoA cosine for the example contained in FIG. 4A, which may be readily compared as follows. The three smallest angles in FIG. 4A are 72.5040, 51.1910, 38.7330 degrees. In cosine space, the three smallest angles are quantized, respectively, to bins 46, 25, 15, which translate to AoA cosine values 0.2969, 0.6250, 0.7812 seen in FIG. 5. Taking the arc cosine of the AoA cosine values values gives the respective quantized angles 72.7300, 51.3178, 38.6248 degrees, which are relatively close the original angles in FIG. 4A. The other AoA cosine returns relatively close to 0 (90 degrees) correspond to reflections off the front (e.g., stronger) and rear (e.g., weaker) walls, and as can be seen roughly bound the intermediate strengths of returns from internal reflections. For example, from FIG. 4A, it may be seen that there is actually a third near-normal return corresponding to a triple bounce, but this is subsumed by the real wall refection in FIG. 5 because they fall into the same quantized bin.

According to example embodiments, beamforming may be utilized to derive a signal that is preferential to components arriving from a given direction and may reject components arriving from other directions. In an example embodiment, simulated beamforming may be performed by convolving the angle cosine response with a characteristic beam pattern. For example, the simulated beamforming may be performed using the fast Fourier transform (FFT) by taking an inverse FFT (IFFT) of the cosine-space response, multiplying by an M-point Blackman window, and taking the FFT. The length of the Blackman window determines the beam resolution, which is roughly 2/M radians, where M may be interpreted as a number of equivalent array elements constituting a beamformer.

Figure 6:
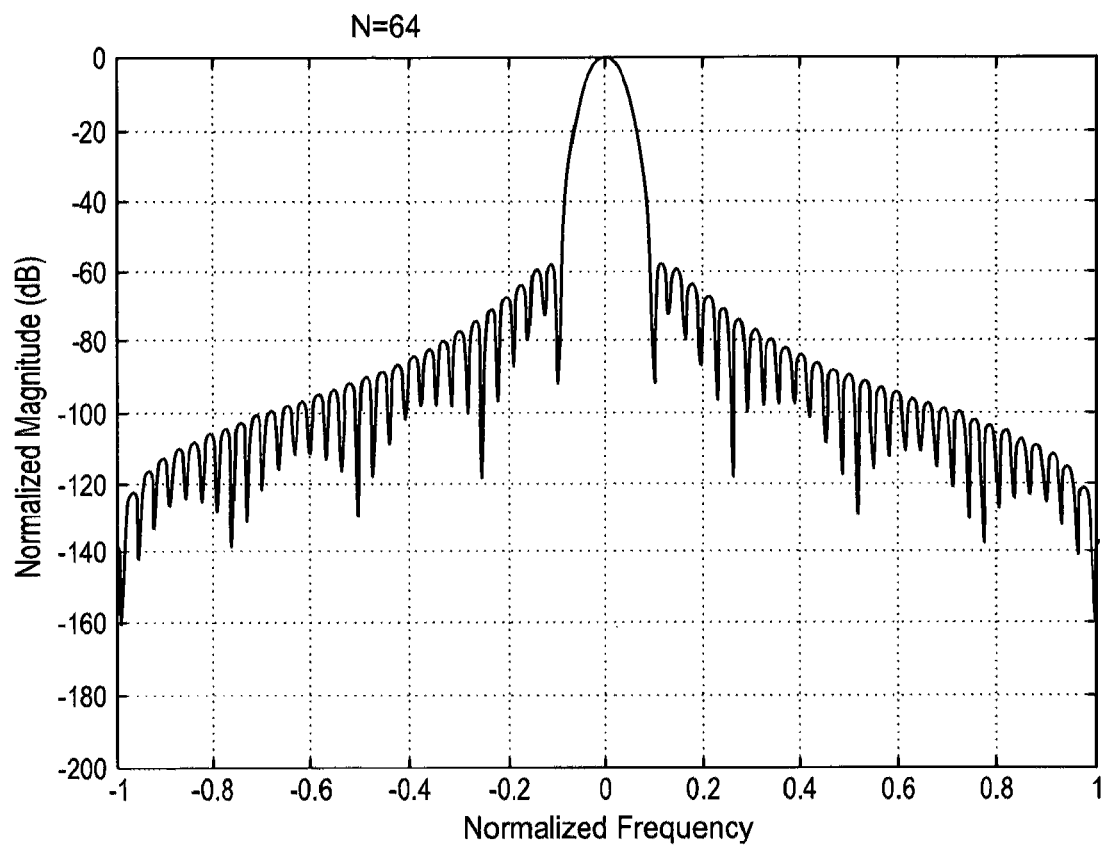
FIG. 6 illustrates an example of a fast Fourier transform of a length-64 Blackman window.

FIG. 6 illustrates an example of FFT of a length-64 Blackman window, and in terms of main lobe width and side lobe level, is intermediate between a Gaussian shape and that of the Hann window. Accordingly, the simulated beamformer responses may be displayed, for example using another drive-by program, based on the FFT of the Blackman window.

Figure 7:
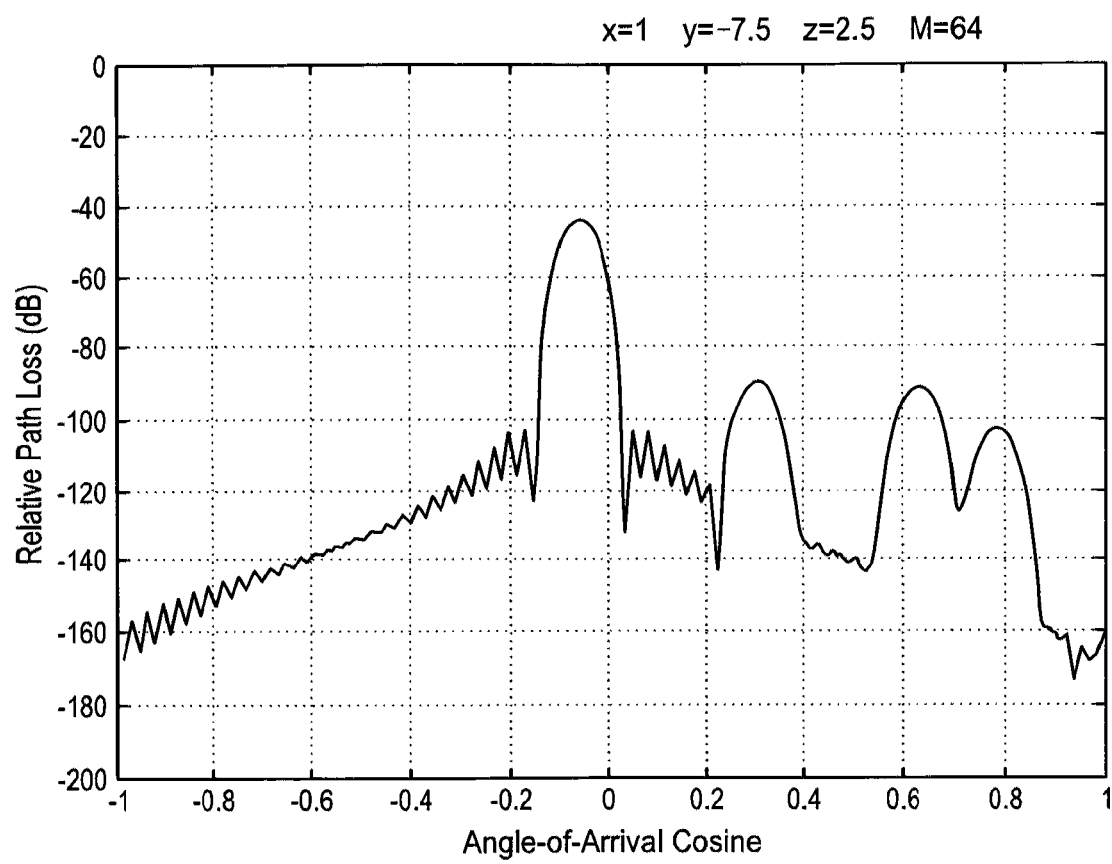
FIG. 7 illustrates one frame of an example simulated beamformer response sequence corresponding to FIG. 5.

FIG. 7 illustrates one frame of an example simulated beamformer response sequence corresponding to FIG. 5. For example, FIG. 7 illustrates a response that is the result of convolving the response of FIG. 5 with the window response of FIG. 6.

As described above, the beamformer output may be displayed as intensity over angle cosine in one dimension versus drive-path distance in the other dimension using, with color added to represent path time delay, (e.g., using a Matlab image routine). The details of each component of the beamformer output display are discussed in more detail below.

In an example embodiment, the amplitude of the returns may be limited to a user-selected range between Amin and Amax (e.g., in dB) and scaled to cover the range from 0 to 1 that the image function expects. Gamma contrast enhancement may be used, where the intensity is raised to a user-selected exponent gam. This process is conducted across the 128 angle cosine bins to form one column of a $128 \times N_x$ matrix for each of the $N_x$ drive path $x_R$ positions. The resulting matrix is may be a monochromatic version of the gram, which is colored by the delay data as is discussed below.

The path delay may be similarly limited between Tmin and Tmax and scaled from 0 to 1. The scaled delay values may index the first 43 bins of a hsv (hue-saturation-value) function (e.g., a hsv Matlab function).

Figure 8:
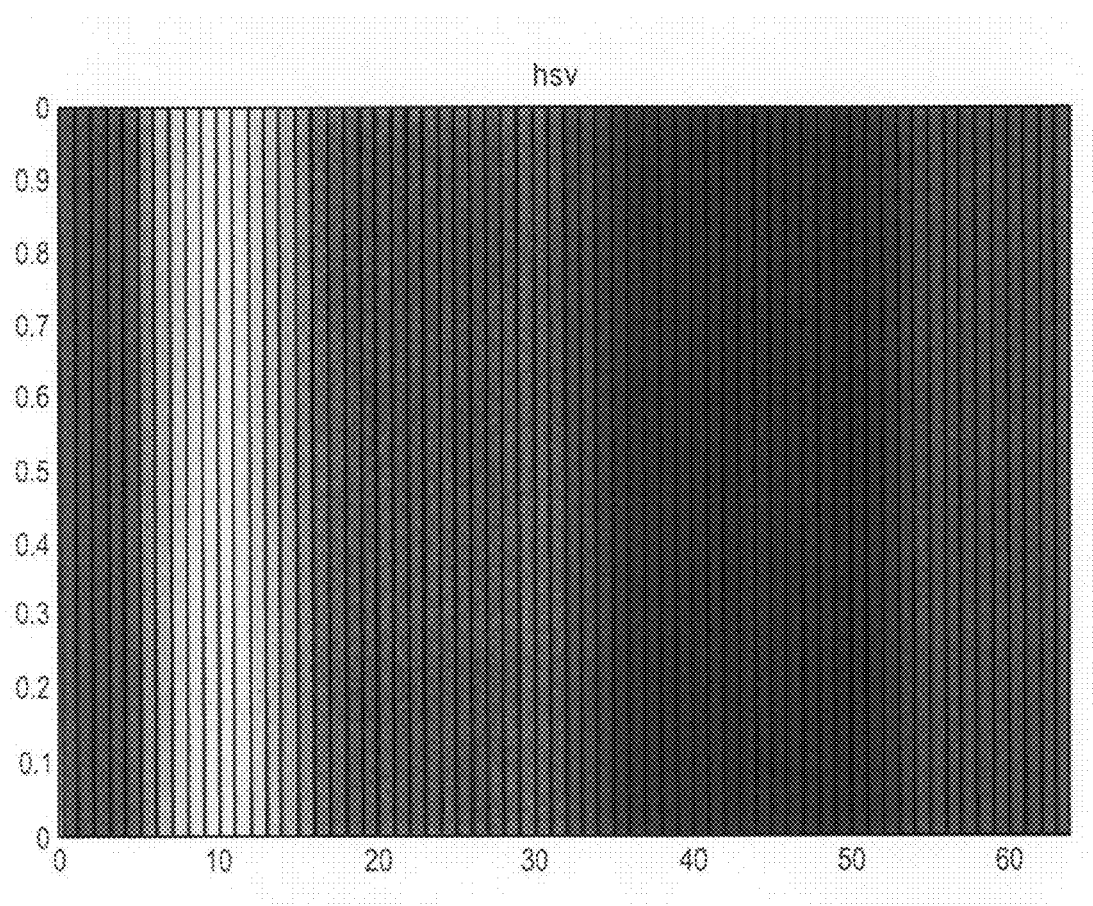
FIG. 8 illustrates a hue-saturation-value (hsv) color map of an example path delay.

FIG. 8 illustrates the hsv color map of an example path delay, which goes from red to blue over the first 43 bins, corresponding to the selected delay range. There are three chroma outputs for each pixel of the angle/distance monochromatic image, and the three chroma outputs are used to generate a 128×$N_x$×3 tensor, where each of the three 128×$N_x$ matrices is a product of the monochromatic matrix and one of the three 128×$N_x$ chroma matrices. Each column of the chroma matrices may be computed by filling in with limited and scaled delay values corresponding to angle cosines of ray returns, and using the same IFFT/Blackman(M)/FFT process as was used to create the simulated beam patterns. Accordingly, the coloring is smeared over the beam patterns as the intensity.

A final displayed image tensor may be of dimension 128× $N_x$×3, where 128 is the number of angle cosine bins, $N_x$ is the number of beamformer snapshots along the x-axis drive path, with 3 chroma components representing path delay. Accordingly, the final image tensor may be displayed, (e.g., using a Matlab program), as shown in FIGS. 9A-9C and 10A-10C and discussed below.

Figure 9A:
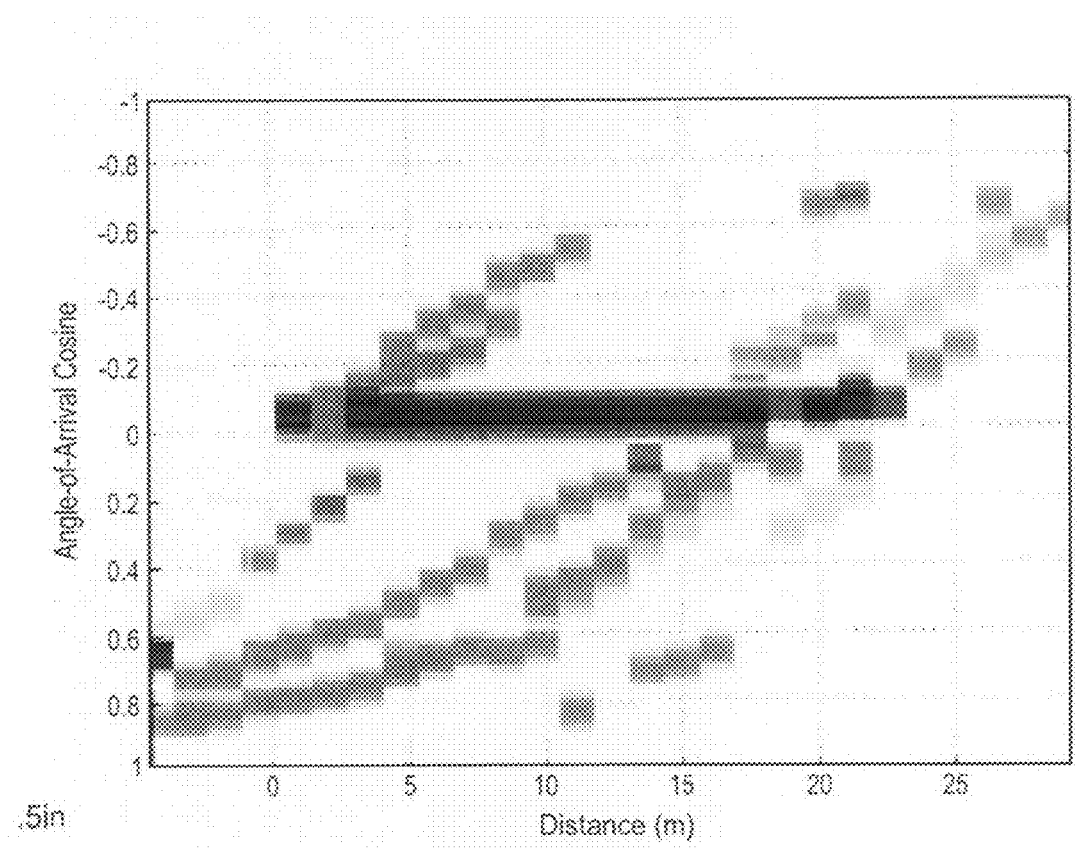
FIG. 9A illustrates a gram plot showing intensity of example simulated beamformer snapshots along a drive path for an empty building.

FIG. 9A illustrates a gram plot showing intensity of example simulated beamformer snapshots along a drive path for an empty building. For example, the gram plot was generated using the same $(x_T, y_T, z_T) = (-5:1:28, -7.5, 2.5)$ drive path as before, with an equivalent M=64 element beamformer, amplitude limits between −140 to −8 dB, gamma exponent of 4, and delay limits between 50 and 250 ns. Horizontal stripes appear near AoA cosine of 0 (90 degrees) if the Tx/Rx are directly in front of the building (e.g., a Rx distance between 1 and 24). The horizontal stripes correspond to near-normal (90-degree) returns from the front wall (red), rear wall (green), and a front/rear wall triple-bounce (blue), where the colors distinguished between the different path delays. Curved segments corresponding to corner reflections from internal walls, where the shape (e.g., as shown in FIG. 2) and color are indicative of the relative angle and distance from the corner to the Tx/Rx position. These features, (e.g., the shape and color) may be used for discerning the interior structure.

An artificial occlusion was placed inside of the example building model as a perfectly reflecting 2-m cube with diagonal corners located at (6,4,0) and (8,6,2), as depicted by the box marked with an "X" in FIGS. 3A-3C.

Figure 9B:
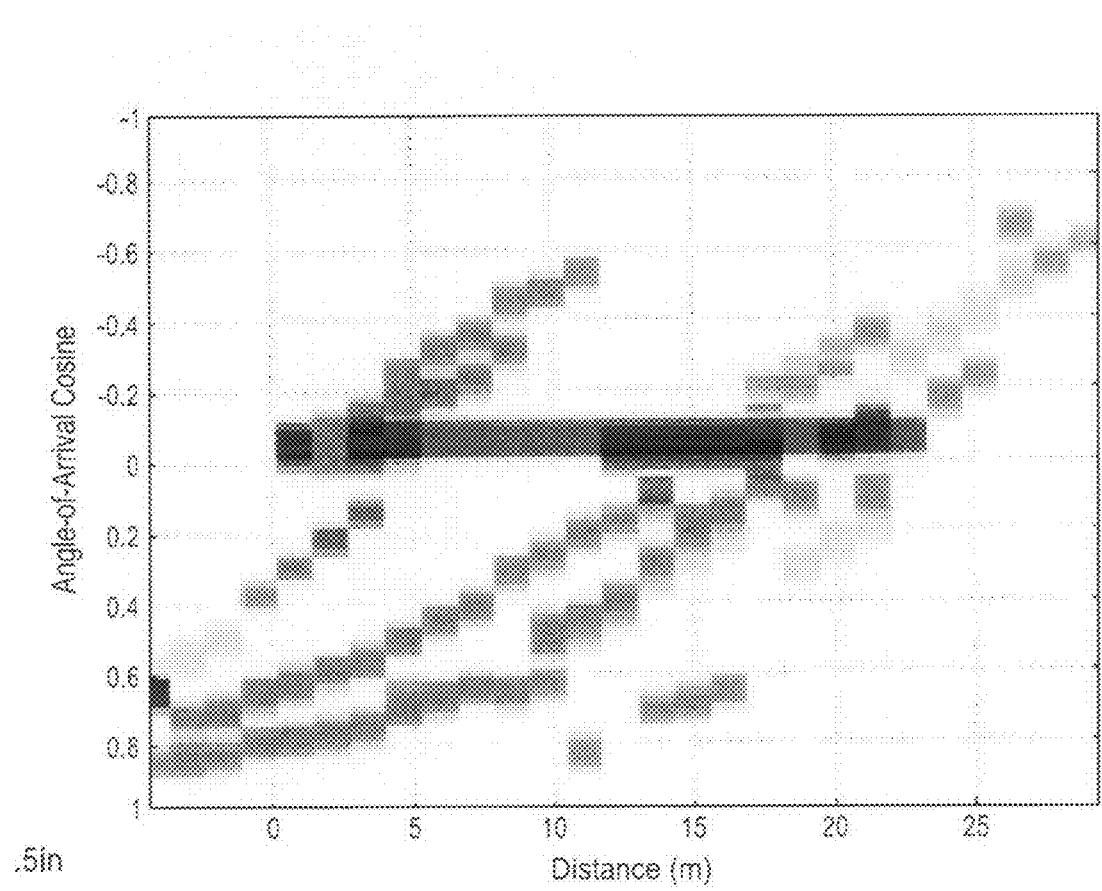
FIG. 9B illustrates a gram plot showing intensity of example simulated beamformer snapshots along a drive path for the building in FIG. 9A with the addition of an occlusion.
Figure 9C:
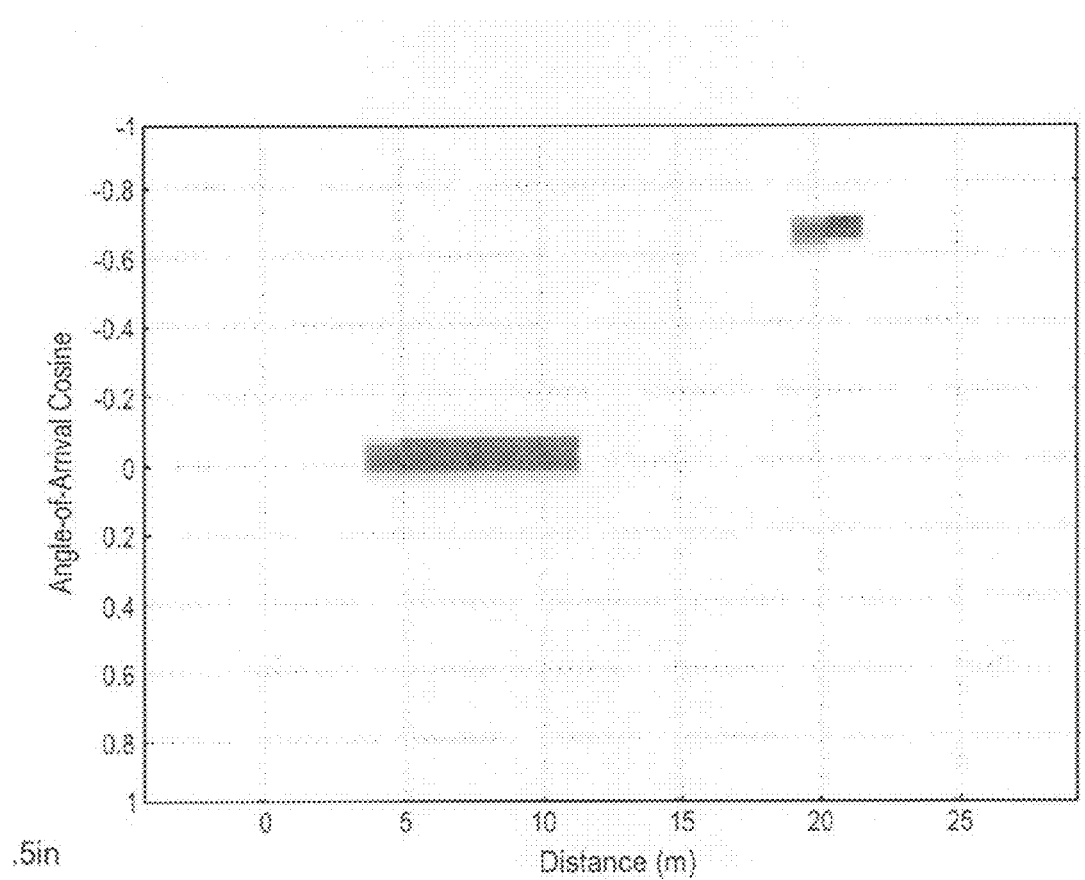
FIG. 9C illustrates a gram plot showing the differences between the gram depicted in FIG. 9A and the gram depicted in FIG. 9B.

FIG. 9B illustrates a gram plot after this occlusion has been introduced. Comparison with FIG. 9A shows two main differences: part of the rear wall return (green and blue horizontal stripe) for Rx distance between 4 and 12, and part of an oblique corner reflection (blue) for Rx distance between 19 and 23 have been obscured by the cube. FIG. 9C illustrates a gram plot showing the differences between the gram depicted in FIG. 9A and the gram depicted in FIG. 9B.

Figure 10A:
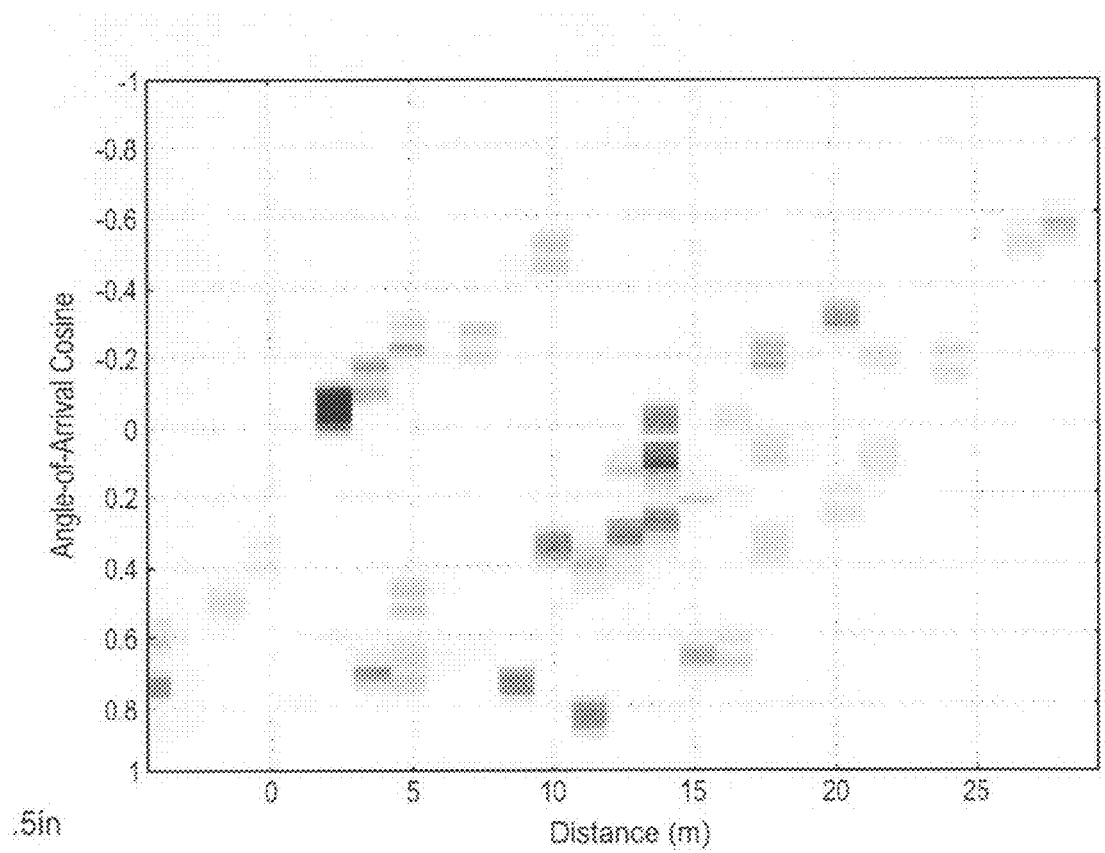
FIGS. 10A-10C show graphs illustrating the effect of 0.1 m changes in drive path along the (a) x, (b) y, and (c) z dimensions, respectively.
Figure 10B:
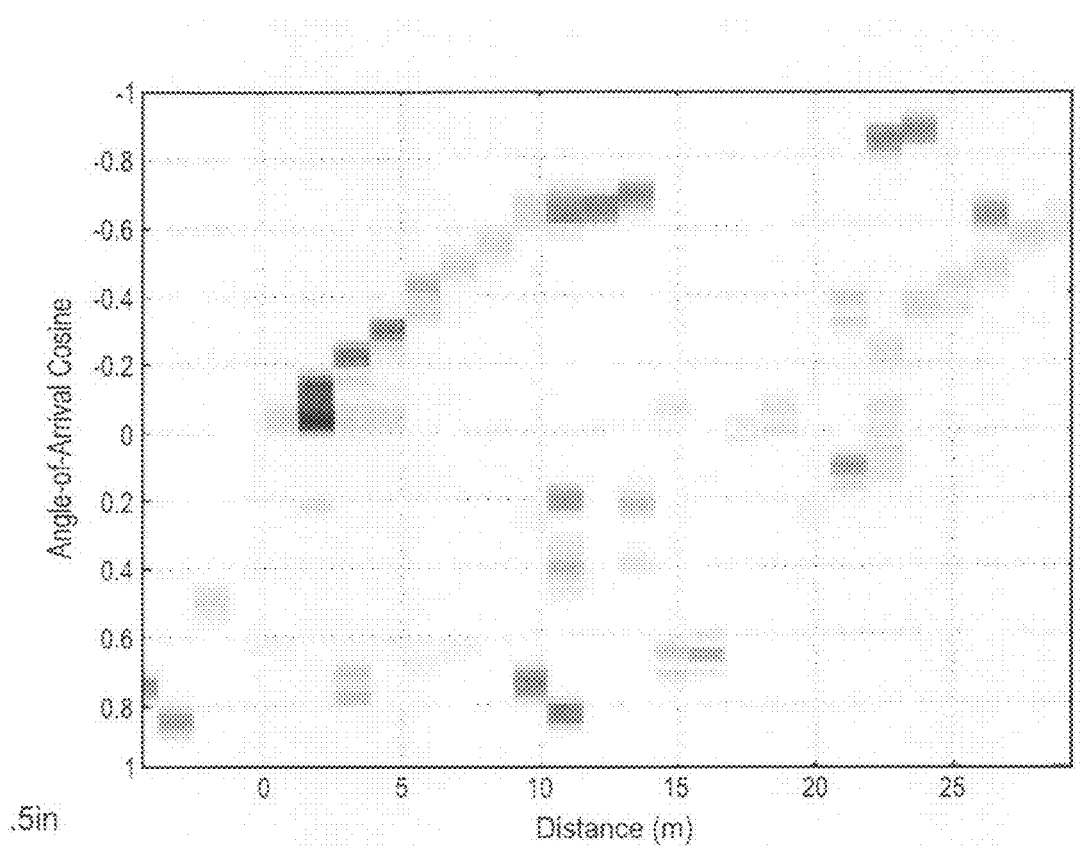
Figure 10C:
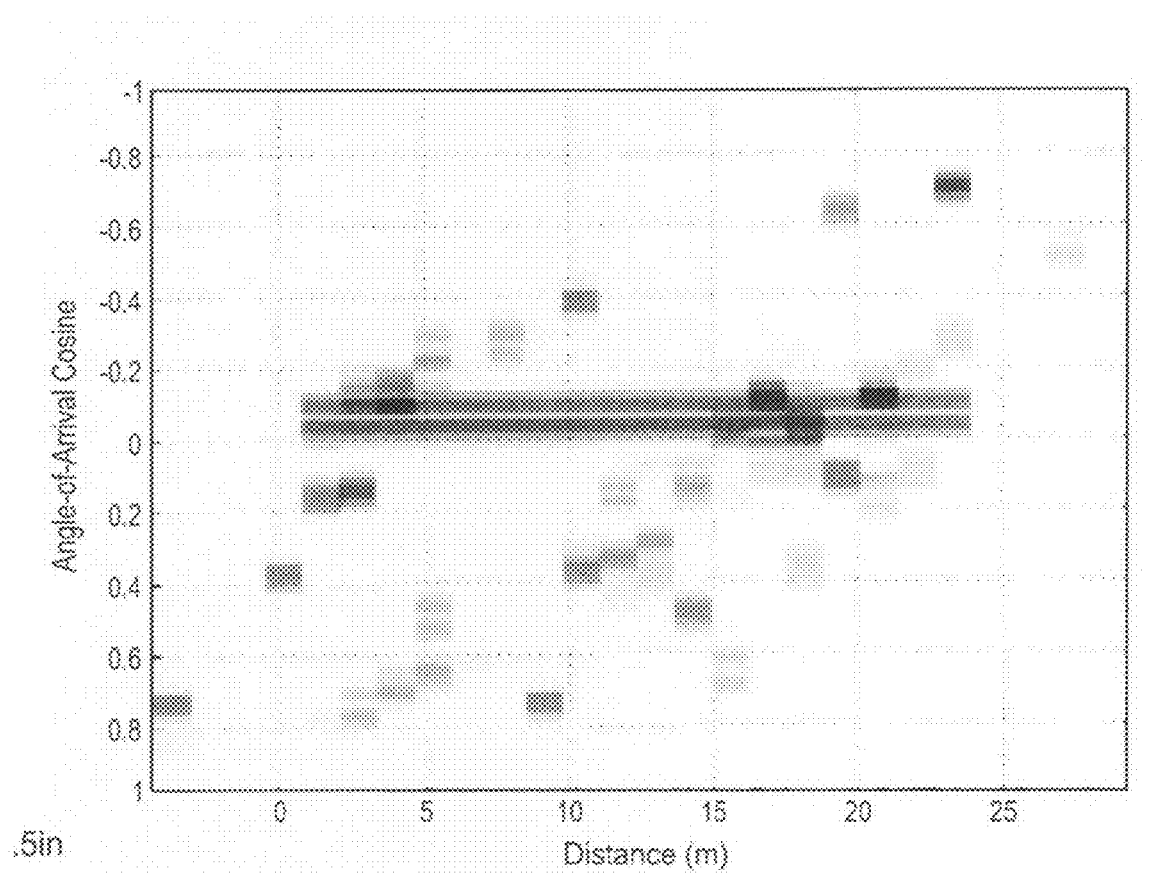

In the real world, an exact same drive path is impossible to repeat, so the robustness of the differential gram technique may depend on sensitivity to relatively small, unaccounted differences in the drive path. FIGS. 10A-10C show graphs illustrating the effect of 0.1 m changes in drive path along the (a) x, (b) y, and (c) z dimensions, respectively. Comparing the shading intensity of these plots with that of FIG. 9C shows that the 0.1 m changes in drive path are comparable to the difference induced by the 2-m cube. Therefore, a method according to example embodiments may be robust to relatively moderate geometrical errors.

According to example embodiments, a ray trace method may generate backscatter data from a simulated building in a drive-by scenario. The data may be used to obtain a "gram" display showing beamformer output amplitude as intensity over angle in one dimension and as distance along the drive path in the other dimension, with color added to represent path time delay. Specular reflections from room corners may form a robust dynamic signature of the building interior. As discussed above, an occlusion inside the building may be reliably detected, as compared to changes induced by drive-path variations less than about 0.1 m.

Actual measurements using a single movable Tx and Rx antenna may be processed to simulate real-time beamformer outputs according to another example embodiment. Preprocessing the data from different drive-by runs of the same building so as to compensate for known differences in the drive path and vehicle velocity record, in order to best align two grams before they are differenced, may be performed by using the aforementioned DTW technique from speech signal processing.

Example embodiments may assess the effect of the external environment in terms of objects, moving or stationary, in the field of view by applying the speech recognition HMM to discriminate between desired and undesired objects. The effect of Tx/Rx antenna height and horizontal/vertical polarization may be adjusted to desired, or alternatively, predetermined levels to further enhance detectability.

According to another example embodiment, an interior structure of a building may be inferred from the gram data. For example, the analytical form of equation (2) and FIG. 2 may be used to match trajectories from the gram, each being capable of identifying a wall corner. The analytical form of equation (2) and FIG. 2 may be pieced together to represent an interior wall structure of a building and/or locations of occlusions that mask certain returns inside a building or structure.

Example embodiments being thus described, it will be obvious that the same may be varied in many ways. Such variations are not to be regarded as a departure from the invention, and all such modifications are intended to be included within the scope of the invention.

I claim:

1. A method, comprising:
transmitting a signal from a plurality of transmit positions along a drive path;
receiving reflections of the transmitted signal at a plurality of receive positions along the drive path;
forming a signature of a structure based on arrival angles of the reflections at each of the receive positions;
inferring an interior of the structure based on the signal; and
comparing the signature to other signatures to detect internal changes within the structure.

2. The method of claim 1, wherein the signature includes the arrival angles of the reflections at each of the receive positions with respect to a distance along the drive path of a corresponding transmit position and a corresponding receive position of each of the reflections.

3. The method of claim 1, wherein each arrival angle of each of the reflections is computed in accordance with the following equation $$\cos\theta = \frac{-\operatorname{sgn}(x)}{\sqrt{1 + R^2/x^2}}, \ |x| \geq \frac{d}{2}$$

wherein θ is an arrival angle of a particular reflection, x is an x-axis location of a corresponding receive position, d is a distance along the drive path between the corresponding transmit position and the corresponding receive position for the particular reflection along the x-axis range, and R is a distance along the y-axis from the drive path to a reflection point of the particular reflection.

4. The method of claim 1, wherein the signature includes an intensity of the received reflections at each of the receive positions along the drive path.

5. The method of claim 1, wherein the signature includes a path delay of the received reflections at each of the receive positions along the drive path with respect to transmit times of corresponding transmit signals.

6. The method of claim 1, further comprising:
representing the signature as a display of the arrival angles of the reflections at each of the receive positions with respect to a distance along the drive path of a corresponding transmit position and a corresponding receive position of each of the reflections at each of the receive positions along the drive path, with coloring to indicate a path delay of the received reflections, the path delay in respect to transmit times of corresponding transmit signals.

7. The method of claim 6, wherein an intensity of the coloring indicates an intensity of the received reflections at each of the receive positions along the drive path.

8. The method of claim 6, wherein a path loss is based on the arrival angle of the received reflections, the path loss being a difference between an intensity of the transmitted signal and an intensity of the received reflections.

9. The method of claim 1, further comprising:
performing beamforming along the drive path to derive the received reflections for the signature.

10. The method of claim 9, further comprising:
distributing the arrival angles of the received reflections across a plurality of bins of a column of a matrix for each corresponding transmit/receive position pair, the bins being filled with a complex path amplitude of the reflections, each column of the matrix corresponding to a single transmit/receive position pair.

11. The method of claim 1, further comprising:
storing the signature as a reference file.

12. The method of claim 1, wherein the inferring the interior of the structure includes matching trajectories of the arrival angles of the reflections to identify corners within the structure.

13. The method of claim 1, wherein the transmitted signal is a wideband RF probe signal.

14. The method of claim 1, wherein the arrival angles are computed in a two-dimensional coordinate system.

15. The method of claim 1, wherein the arrival angles are computed in a three-dimensional coordinate system.

* * * * *